US012190407B2

(12) United States Patent
Zhang

(10) Patent No.: US 12,190,407 B2
(45) Date of Patent: Jan. 7, 2025

(54) VIRTUAL IMAGE GENERATION METHOD, DEVICE, TERMINAL AND STORAGE MEDIUM

(71) Applicant: BEIJING BYTEDANCE NETWORK TECHNOLOGY CO., LTD., Beijing (CN)

(72) Inventor: Shupeng Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 17/773,559

(22) PCT Filed: Sep. 11, 2020

(86) PCT No.: PCT/CN2020/114797
§ 371 (c)(1),
(2) Date: Apr. 29, 2022

(87) PCT Pub. No.: WO2021/082760
PCT Pub. Date: May 6, 2021

(65) Prior Publication Data
US 2022/0405986 A1 Dec. 22, 2022

(30) Foreign Application Priority Data
Oct. 31, 2019 (CN) .......................... 201911053933.6

(51) Int. Cl.
*G06T 11/00* (2006.01)
*G06F 3/04817* (2022.01)
(Continued)

(52) U.S. Cl.
CPC .......... *G06T 11/00* (2013.01); *G06F 3/04817* (2013.01); *G06F 3/0482* (2013.01);
(Continued)

(58) Field of Classification Search
CPC ......... G06T 11/00; G06T 17/10; G06T 19/00; G06T 13/40; G06T 19/20; G06F 3/04817;
(Continued)

(56) References Cited

U.S. PATENT DOCUMENTS 10,375,313 B1  8/2019  Van Os et al.
10,452,896 B1  10/2019 Weise et al.
(Continued)

FOREIGN PATENT DOCUMENTS

CN  101847268 A  9/2010
CN  102542586 A  7/2012
(Continued)

OTHER PUBLICATIONS

International Patent Application No. PCT/CN2020/114797; Int'l Search Report; dated Dec. 11, 2020; 2 pages.
(Continued)

*Primary Examiner* — Jin Cheng Wang
(74) *Attorney, Agent, or Firm* — BakerHostetler

(57) ABSTRACT

An avatar generating method and device, a terminal and a storage medium are provided. The avatar model corresponding to the target object is acquired by collecting a frame image of the target object, and the avatar of the target object is rendered based on the avatar model. The similarity between each part of a head of the avatar model and a corresponding part of a head of the target object meets a similarity condition, so that the avatar is generated based the feature of each part of the head of the target object, and different target objects correspond to different avatars.

17 Claims, 14 Drawing Sheets

(51) Int. Cl.
  *G06F 3/0482* (2013.01)
  *G06V 10/74* (2022.01)
  *G06V 40/16* (2022.01)
  *H04N 23/60* (2023.01)
  *H04N 23/63* (2023.01)

(52) U.S. Cl.
  CPC .......... *G06V 10/761* (2022.01); *G06V 40/171* (2022.01); *H04N 23/635* (2023.01); *H04N 23/64* (2023.01); *G06T 2200/24* (2013.01)

(58) Field of Classification Search
  CPC ...... G06F 3/0482; G06V 10/74; G06V 40/16; H04N 5/232
  See application file for complete search history.

(56) References Cited

U.S. PATENT DOCUMENTS

| | | | | |
|---|---|---|---|---|
| 10,659,405 | B1* | 5/2020 | Chang | G06F 3/04817 |
| 10,977,873 | B2* | 4/2021 | Lee | G06T 11/001 |
| 11,055,889 | B2* | 7/2021 | Lee | G06V 40/166 |
| 11,722,764 | B2* | 8/2023 | Van Os | H04M 1/72436 |
| | | | | 348/239 |
| 2011/0292051 | A1* | 12/2011 | Nelson | G06V 40/171 |
| | | | | 345/467 |
| 2017/0018056 | A1 | 1/2017 | Holzer et al. | |
| 2017/0113140 | A1* | 4/2017 | Blackstock | A63F 13/35 |
| 2018/0268595 | A1* | 9/2018 | Sarna | G06T 13/80 |
| 2019/0188320 | A1* | 6/2019 | Gordon | G06F 16/739 |
| 2019/0266807 | A1* | 8/2019 | Lee | G06T 13/40 |
| 2019/0340419 | A1* | 11/2019 | Milman | G06T 13/80 |
| 2019/0377481 | A1* | 12/2019 | Otsuka | G06V 40/172 |
| 2020/0051341 | A1* | 2/2020 | Lee | G06T 13/40 |
| 2020/0202111 | A1* | 6/2020 | Yuan | G06V 20/20 |
| 2020/0372692 | A1* | 11/2020 | Ge | G06V 40/165 |
| 2020/0402304 | A1* | 12/2020 | Hwang | G06V 40/176 |
| 2021/0001223 | A1* | 1/2021 | Zhang | A63F 13/352 |
| 2023/0343053 | A1* | 10/2023 | Scapel | G06F 3/04842 |

FOREIGN PATENT DOCUMENTS

| | | |
|---|---|---|
| CN | 103631370 A | 3/2014 |
| CN | 106708850 A | 5/2017 |
| CN | 107589889 A | 1/2018 |
| CN | 109857311 A | 6/2019 |
| CN | 109992187 A | 7/2019 |
| CN | 110827378 A | 2/2020 |

OTHER PUBLICATIONS

Wu Xixian; "You can play without iPhone X, the video artifact that generates 3D animated avatars with one click is here"; https://www.ifanr.com/app/1167912; ifanr; Jan. 2019; accessed Apr. 28, 2022; 39 pages.

* cited by examiner

… (1)

VIRTUAL IMAGE GENERATION METHOD, DEVICE, TERMINAL AND STORAGE MEDIUM

The present application is the national phase application of International Patent Application No. PCT/CN2020/114797, titled "VIRTUAL IMAGE GENERATION METHOD, DEVICE, TERMINAL AND STORAGE MEDIUM", filed on Sep. 11, 2020, which claims priority to Chinese Patent application Ser. No. 201911053933.6, titled "VIRTUAL IMAGE GENERATION METHOD, DEVICE, TERMINAL AND STORAGE MEDIUM", filed on Oct. 31, 2019, with the State Intellectual Property Office of People's Republic of China, both of which are incorporated herein by reference in their entireties.

FIELD

The present disclosure relates to the field of video processing technology, and in particular to an avatar generating method, device, terminal and a storage medium.

BACKGROUND

With the rapid development of the internet industries, the "virtual world" is increasingly developed due to the artificial intelligence, such as animation, live broadcast, operation of short videos, which all involves construction of "avatars". In the conventional art, general templates are commonly used to provide users with "avatars". However, the template "avatars" are similar, which lack personalization, resulting in a poor user experience.

SUMMARY

In view of this, an avatar generating method, an avatar generating device, a terminal, and a storage medium are provided according to embodiments of the present disclosure.

In a first aspect, an avatar generating method is provided according to an embodiment of the present disclosure, which includes:
 presenting, in response to an avatar generation instruction triggered through a view interface, an image collection interface of a target object;
 collecting a frame image of the target object based on the image collection interface;
 acquiring, based on the collected frame image of the target object, an avatar model corresponding to the target object, where a similarity between each part of a head of the avatar model and a corresponding part of a head of the target object meets a similarity condition; and
 rendering and presenting an avatar of the target object based on the avatar model.

In the above solution, before the presenting an image collection interface of a target object, the method further includes:
 presenting, in response to a click operation on a presented shooting button, an image collection interface including a resource function item; and
 presenting, in response to a click operation on the resource function item, a toolbar including an avatar icon, where the avatar icon is used to trigger an avatar generation instruction in a case that the click operation is received.

In the above solution, the method further includes:
 receiving a back instruction for a current application process during an operation of collecting the frame image of the target object; and
 presenting, in response to the back instruction, the toolbar including the avatar icon, where the avatar icon is focused in the toolbar.

In the above solution, the presenting an image collection interface of a target object includes:
 loading an image scanning material including an image scanning frame; and
 presenting the image scanning frame in the image collection interface, where the image scanning frame matches a contour of the target object.

In the above solution, the collecting a frame image of the target object based on the image collection interface includes:
 collecting the frame image of the target object based on the image scanning frame presented in the image collection interface; and
 presenting prompt information in a case that the contour of the target object in the collected frame image does not match the image scanning frame, where the prompt information is used to prompt adjustment of at least one of a shooting posture, a shooting angle, and a shooting distance.

In the above solution, the acquiring, based on the collected frame image of the target object, an avatar model corresponding to the target object includes:
 acquiring, based on the collected frame image of the target object, a feature of each part of the head of the target object;
 sending an acquisition request carrying the feature of each part of the head of the target object; and
 receiving the avatar model corresponding to the target object that is returned,
where the feature of each part of the head is used to predict a category to which each part of the head belongs, to determine a material corresponding to each part of the head based on the predicted category, where the material corresponding to each part of the head is used to generate the avatar model.

In the above solution, the method further includes:
 generating an avatar icon corresponding to the avatar of the target object, where the avatar icon is used to present the avatar of the target object when a click operation is received; and
 adding the avatar icon corresponding to the avatar of the target object to a toolbar in the image collection interface.

In the above solution, the method further includes:
 determining the number of the avatar icon that is generated;
 closing a function entry that triggers the avatar generation instruction in a case that the number of the avatar icon reaches a number threshold.

In the above solution, the method further includes:
 collecting, based on the image collection interface, multiple consecutive frame images of the target object;
 acquiring key point change information of the target object in the multiple consecutive frame images; and
 dynamically presenting, based on the key point change information, the avatar of the target object.

In the above solution, after the rendering and presenting the avatar of the target object, the method further includes:
 receiving a modification instruction for the avatar of the target object;

acquiring, based on the modification instruction, an updated avatar model corresponding to the target object; and updating, based on the updated avatar model, the presented avatar of the target object.

In the above solution, after the rendering and presenting the avatar of the target object, the method further includes:

obtaining user information of a current logged-in target user; and establishing an association relationship between the user information and the avatar model, to acquire the avatar model based on the user information and the association relationship when the target user logs-in again.

In a second aspect, an avatar generating device is provided according to an embodiment of the present disclosure, which includes: a first presentation module, a collection module, an acquisition module, and a second presentation module. The first presentation module is configured to present, in response to an avatar generation instruction triggered through a view interface, an image collection interface of a target object. The collection module is configured to collect a frame image of the target object based on the image collection interface. The acquisition module is configured to acquire, based on the collected frame image of the target object, an avatar model corresponding to the target object, where a similarity between each part of a head of the avatar model and a corresponding part of a head of the target object meets a similarity condition. The second presentation module is configured to render and present the avatar of the target object based on the avatar model.

In the above solution, the first presentation module is further configured to present, in response to a click operation on a presented shooting button, an image collection interface including a resource function item; and present, in response to a click operation on the resource function item, a toolbar including an avatar icon, where the avatar icon is configured to trigger an avatar generation instruction in a case that the click operation is received.

In the above solution, the first presentation module is further configured to receive a back instruction for a current application process during an operation of collecting the frame image of the target object; and present, in response to the back instruction, the toolbar including the avatar icon, where the avatar icon is focused in the toolbar.

In the above solution, the first presentation module is further configured to load an image scanning material including an image scanning frame; and present the image scanning frame in the image collection interface, where the image scanning frame matches a contour of the target object.

In the above solution, the collection module is further configured to collect the frame image of the target object based on the image scanning frame presented in the image collection interface; and present prompt information in a case that the contour of the target object in the collected frame image does not match the image scanning frame, where the prompt information is configured to prompt adjustment of at least one of a shooting posture, a shooting angle, and a shooting distance.

In the above solution, the acquisition module is further configured to acquire, based on the collected frame image of the target object, a feature of each part of the head of the target object; send an acquisition request carrying the feature of each part of the head of the target object; and receive the avatar model corresponding to the target object that is returned, where the feature of each part of the head is configured to predict a category to which each part of the head belongs, to determine a material corresponding to each part of the head based on the predicted category, where the material corresponding to each part of the head is configured to generate the avatar model.

In the above solution, the device further includes: an addition module. The addition module is configured to generate an avatar icon corresponding to the avatar of the target object, where the avatar icon is used to present the avatar of the target object when a click operation is received; and add the avatar icon corresponding to the avatar of the target object to a toolbar in the image collection interface.

In the above solution, the addition module is further configured to determine the number of the avatar icon that is generated; close a function entry that triggers the avatar generation instruction in a case that the number of the avatar icon reaches a number threshold.

In the above solution, the second presentation module is further configured to collect, based on the image collection interface, multiple consecutive frame images of the target object; acquire key point change information of the target object in the multiple consecutive frame images; and dynamically present, based on the key point change information, the avatar of the target object.

In the above solution, the device further includes a modification module. The modification module is configured to receive a modification instruction for the avatar of the target object; acquire, based on the modification instruction, an updated avatar model corresponding to the target object; and update, based on the updated avatar model, the presented avatar of the target object.

In the above solution, the device further includes an obtaining module. The obtaining module is configured to obtain user information of a current logged-in target user; and establish an association relationship between the user information and the avatar model, to acquire the avatar model based on the user information and the association relationship when the target user logs-in again.

In a third aspect, a terminal is provided according to an embodiment of the present disclosure, which includes a memory and a processor. The memory is configured to store executable instructions. The processor is configured to perform, when executing the executable instructions, the avatar generating method according to any one of the above embodiments of the present disclosure.

In a fourth aspect, a storage medium is provided according to an embodiment of the present disclosure, which stores executable instructions. The executable instructions, when executed, performs the avatar generating method according to any one of the above embodiments of the present disclosure.

The above embodiments of the present disclosure have the following beneficial effects. According to the above embodiments of the present disclosure, the avatar model corresponding to the target object is acquired by collecting a frame image of the target object, and the avatar of the target object is rendered based on the avatar model. The similarity between each part of a head of the avatar model and a corresponding part of a head of the target object meets a similarity condition, so that the avatar is generated based the feature of each part of the head of the target object, and different target objects correspond to different avatars, thereby generating a personalized avatar, thus improving the user experience.

BRIEF DESCRIPTION OF THE DRAWINGS

The above and other features, advantages and aspects of the embodiments of the present disclosure will become more apparent when taken in conjunction with the drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION OF EMBODIMENTS

Figure 1:
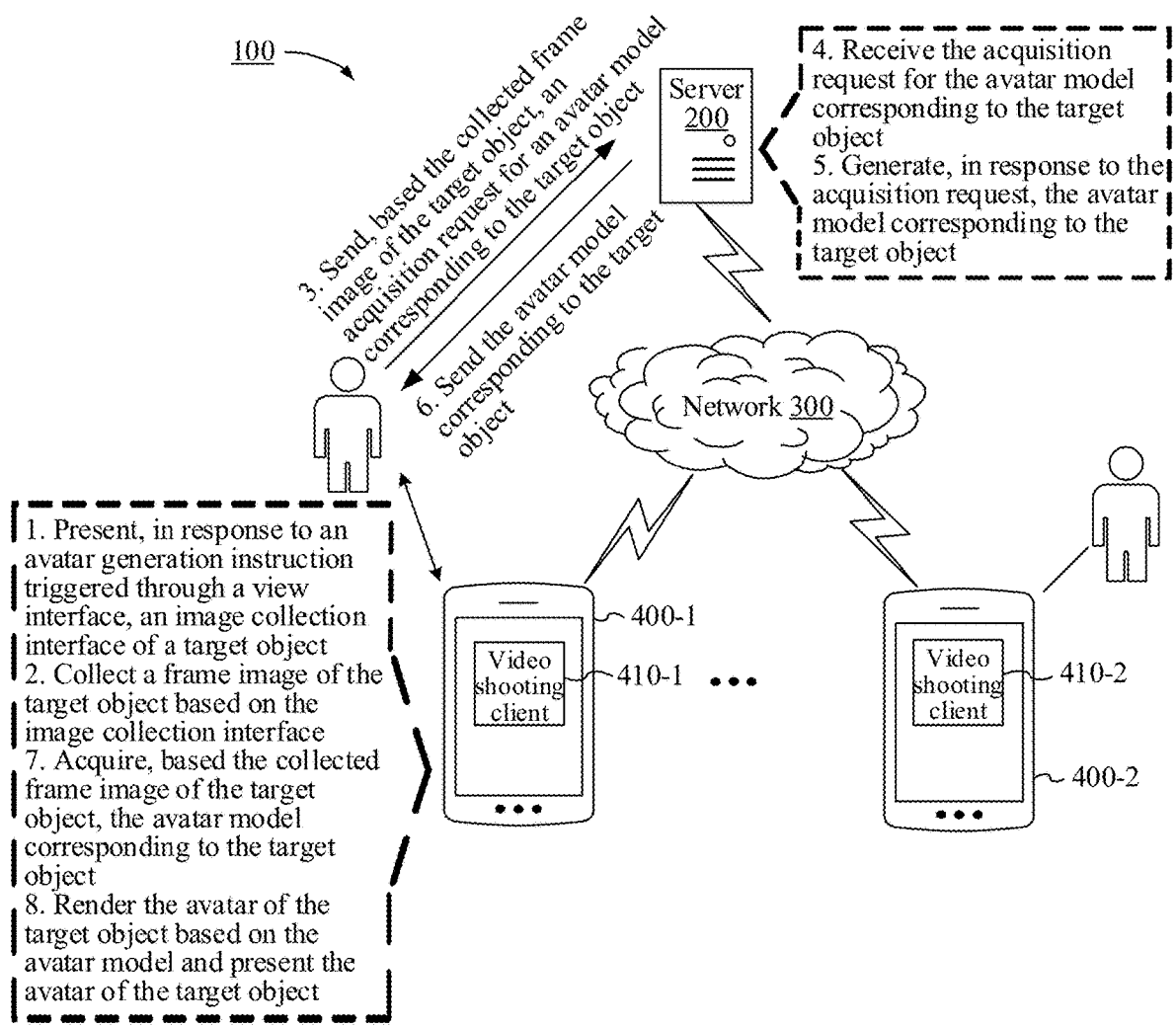
FIG. 1 is a schematic structural diagram of an avatar generating system according to an embodiment of the present disclosure.

Embodiments of the present disclosure will be described in more detail below with reference to the drawings. While some embodiments of the present disclosure are shown in the drawings, it should be understood that the present disclosure may be embodied in various forms and should not be construed as limited to the embodiments set forth herein, and the embodiments are provided for the purpose of more thorough and complete understanding of the present disclosure. It should be understood that the drawings and embodiments of the present disclosure are only for exemplary purposes, and are not intended to limit the protection scope of the present disclosure.

It should be understood that the various steps described in the method embodiments of the present disclosure may be performed in different orders and/or in parallel. Furthermore, method embodiments may include additional steps and/or omit performing the illustrated steps. The scope of the present disclosure is not limited in this regard.

As used herein, the term "including" and variations thereof are non-inclusive, that is, "including but not limited to". The term "based on" means "based at least in part on". The term "one embodiment" means "at least one embodiment". The term "another embodiment" means "at least one another embodiment". The term "some embodiments" means "at least some embodiments". Definitions of other terms will be given in the description below.

It should be noted that concepts such as "first" and "second" mentioned in the present disclosure are only used to distinguish different devices, modules or units, and are not used to limit the order of functions performed by these devices, modules or units or interdependence thereof.

It should be noted that the definitions "a", "multiple" and "a plurality" mentioned in the present disclosure are illustrative rather than restrictive, and those skilled in the art should understand that unless the context clearly indicates otherwise, they should be understood as "one or more".

The names of messages or information exchanged between multiple devices in the embodiments of the present disclosure are only for illustrative purposes, and are not intended to limit the scope of these messages or information.

Before further describing the embodiments of the present disclosure in detail, the phrases and terms involved in the embodiments of the present disclosure will be described, and the phrases and terms involved in the embodiments of the present disclosure are described as follows.

1) An avatar is obtained by converting, through intelligent recognition, the expression, action, demeanor and language and the like of a user into that of a virtual character in real time, facial expressions, gestures, voice and intonation of the avatar can completely replicate that of the user himself.

2) "In response" represents a condition or state on which an executed operation depends. When the dependent condition or state is met, one or more executed operations may be performed in real-time or with a set time delay. Unless otherwise specified, there is no restriction on the order of performing the executed operations.

Based on the above explanations of phrases and terms involved in the embodiments of the present disclosure, referring to FIG. 1, which is a schematic structural diagram of an avatar generation system according to an embodiment of the present disclosure. In order to support an exemplary application, a terminal 400 (including terminals 400-1 and 400-2) is connected to a server 200 via a network 300. The network 300 may be a wide area network or a local area network, or a combination of the two, which realizes data transmission by using wireless or wired links.

The terminal 400 (for example, the terminal 400-1) is configured to: present an image collection interface of a target object in response to an avatar generation instruction triggered through a view interface; collect, based on the image collection interface, a frame image of the target object; acquire, based on the acquired frame image of the target object, an avatar model corresponding to the target object; rendering and presenting an avatar of the target object based on the avatar model.

The terminal 400 (for example, the terminal 400-1) is further configured to send an acquisition request for the avatar model corresponding to the target object based on the collected frame image of the target object.

The server 200 is configured to receive the acquisition request for the avatar model corresponding to the target object; and generate, based on the acquisition request, the avatar model corresponding to the target object and send the avatar model to the terminal.

Here, in practice, the terminal 400 may be various types of user terminals such as smart phones, tablet computers, and notebook computers, and may also be wearable computing devices, personal digital assistants (PDAs), desktop computers, cellular phones, and media playback devices, navigation devices, game consoles, televisions, or any combination of two or more of these data processing devices or other data processing devices. The server 200 may be a single server that is configured to support various services, or may be a server cluster.

Figure 2:
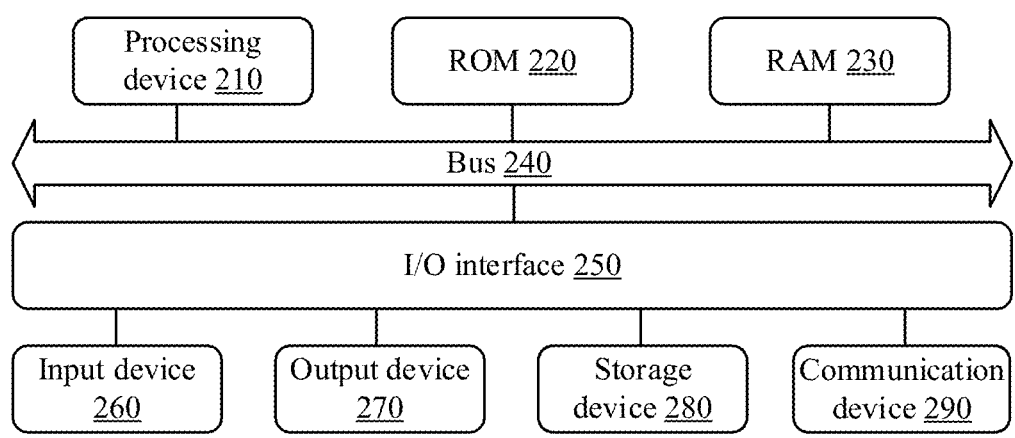
FIG. 2 is a schematic structural diagram of an electronic device according to an embodiment of the present disclosure.

Referring to FIG. 2, FIG. 2 is a schematic structural diagram of an electronic device according to an embodiment of the present disclosure. Electronic devices may be various terminals, including mobile terminals such as mobile phones, notebook computers, digital broadcast receivers, personal digital assistants (PDAs), tablet computers (PADs), portable multimedia players (PMPs), vehicle terminals (such as in-vehicle navigation terminals), and stationary terminals such as digital televisions (TVs), desktop computers. The electronic device shown in FIG. 2 is only an example, and should not impose any limitation on the function and usage scope of the embodiments of the present disclosure.

As shown in FIG. 2, the electronic device may include a processing device 210 (for example, a central processing unit, a graphics processor, and the like), which may execute various appropriate actions and processes according to a program stored in a read-only memory (ROM) 220 or a program loaded from a storage device 280 into a random access memory (RAM) 230. In the RAM 230, various programs and data necessary for the operation of the electronic device are also stored. The processing device 210, the ROM 220, and the RAM 230 are connected to each other through a bus 240. An input/output (I/O) interface 250 is also connected to the bus 240.

Generally, the following devices may be connected to the I/O interface 250: input devices 260 including, for example, a touch screen, a touchpad, a keyboard, a mouse, a camera, a microphone, an accelerometer, a gyroscope, and the like; output devices 270 including, for example, a Liquid Crystal Display (LCD), a speaker, a vibrator, and the like; storage devices 280 including, for example, a magnetic tape, a hard disk, and the like; and a communication device 290. The communication device 290 may allow the electronic device to communicate wirelessly or by wire with other devices to exchange data.

In particular, the processes described by the provided flowchart may be implemented as computer software programs according to embodiments of the present disclosure. For example, an embodiment of the present disclosure includes a computer program product including a computer program carried on a computer-readable medium, the computer program contains program codes for performing the method shown in the flowchart. In such an embodiment, the computer program may be downloaded and installed from the network through the communication device 290, or from the storage device 280, or from the ROM 220. When the computer program is executed by the processing device 220, the functions in the avatar generating method of the embodiment of the present disclosure are executed.

It should be noted that, the computer-readable medium described above in the embodiment of the present disclosure may be a computer-readable signal medium or a computer-readable storage medium, or a combination thereof. The computer-readable storage medium may include, but is not limited to, electrical, magnetic, optical, electromagnetic, infrared, or semiconductor systems, apparatuses, or devices, or any combination thereof, for example. More specific examples of computer readable storage medium may include, but are not limited to, electrical connections with one or more wires, portable computer disks, hard disks, RAM, ROM, Erasable Programmable Read Only Memory (EPROM), flash memory, fiber optics, portable compact disk read only memory (CD-ROM), optical storage devices, magnetic storage devices, or any suitable combination thereof.

In the embodiments of the present disclosure, a computer-readable storage medium may be any tangible medium that contains or stores a program that may be used by or in conjunction with an instruction execution system, apparatus, or device. In embodiment of the present disclosure, a computer-readable signal medium may include a data signal in baseband or propagated as part of a carrier wave, which carries computer-readable program codes therein. Such propagated data signals may take a variety of forms, including but not limited to electromagnetic signals, optical signals, or any suitable combination thereof. A computer-readable signal medium may also be any computer-readable medium other than a computer-readable storage medium that may transmit, propagate, or transport the program for use by or in connection with the instruction execution system, apparatus, or device. Program codes embodied on a computer-readable medium may be transmitted using any suitable medium, including electrical wire, optical fiber cable, radio frequency (RF), and the like, or any suitable combination thereof.

The above computer-readable medium may be included in the above electronic device, or may exist alone without being incorporated into the electronic device.

The above computer-readable medium carries one or more programs, and when the one or more programs are executed by the electronic device, the electronic device executes the avatar generating method according to the embodiment of the present disclosure.

Computer program codes for performing operations in embodiments of the present disclosure may be written in one or more programming languages, including object-oriented programming languages, such as Java, Smalltalk, and C++, and conventional procedural programming languages, such as the "C" language or similar programming language. The program codes may be executed entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of networks, including a Local Area Network (LAN) and a Wide Area Network (WAN), or the remote computer may be connected to an external computer (for example, via the internet by an internet service provider).

Embodiments of the present disclosure provide flowcharts and block diagrams illustrating the architecture, functionality, and operation of possible implementations of systems, methods, and computer program products according to various embodiments of the present disclosure. Each block in the flowchart or block diagrams may represent a module, a segment of program, or portion of codes that contains executable instructions for implementing the specified one or more logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented by dedicated hardware-based systems that perform the specified functions or operations, or may be implemented by a combination of dedicated hardware and computer instructions.

The units involved in the embodiments of the present disclosure may be implemented in a software manner, and may also be implemented in a hardware manner. Names of the units do not constitute any limitation to the units under certain circumstances, for example, a first obtaining unit may also be described as "a unit that obtains at least two Internet Protocol addresses".

The functions described in the embodiments of the present disclosure may be performed, at least in part, by one or more hardware logic components. For example, without limitation, exemplary types of hardware logic components that may be used include: Field-Programmable Gate Array (FPGA), Application Specific Integrated Circuit (ASIC), Application Specific Standard Parts (ASSP), system on chip (SOC), complex programmable logic device (CPLD), and so on.

In the context of embodiments of the present disclosure, a machine-readable medium may be a tangible medium that may contain or store a program for use by or in connection with an instruction execution system, apparatus, or device. The machine-readable medium may be a machine-readable signal medium or a machine-readable storage medium. Machine-readable medium may include, but is not limited to, electronic, magnetic, optical, electromagnetic, infrared, or semiconductor systems, devices, or devices, or any suitable combination thereof. More specific examples of machine-readable storage medium may include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

Figure 3:
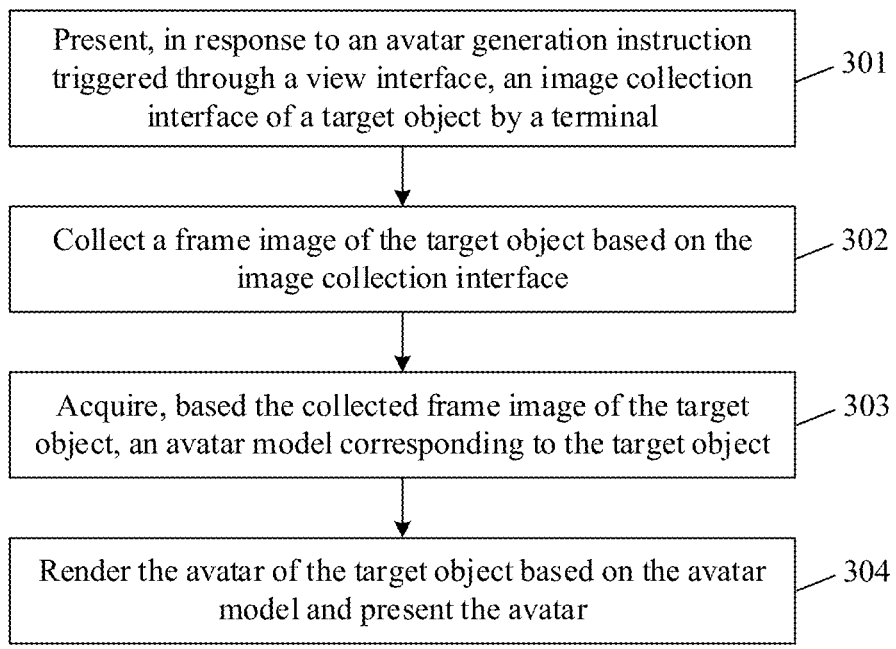
FIG. 3 is a schematic flowchart of an avatar generating method according to an embodiment of the present disclosure.

An avatar generating method according to an embodiment of the present disclosure is described below. Referring to FIG. 3, FIG. 3 is a schematic flow chart of an avatar generating method according to an embodiment of the present disclosure. The avatar generating method according to an embodiment of the present disclosure includes the following steps 301 to 304.

In step 301, a terminal presents an image collection interface of a target object in response to an avatar generation instruction triggered through a view interface.

In some embodiments, the terminal is installed with a client with a video shooting function, such as a short video APP, and the terminal may perform steps according to corresponding operation instructions of a user for the client terminal. In practice, when a user needs to shoot a video related to an avatar, an avatar generation instruction may be triggered by sliding, clicking and other operations on the view interface displayed on the terminal.

In some embodiments, the terminal may respond to a user operation by triggering an avatar generation instruction in the following manner: presenting, in response to a click operation on a presented shooting button, an image collection interface including a resource function item; and presenting, in response to a click operation on the resource function item, a toolbar including an avatar icon, where the avatar icon is used to trigger the avatar generation instruction when the click operation is received.

When detecting that the user clicks the shooting button displayed on the terminal, the terminal presents, based on the click operation, an image collection interface through the view interface, and the image collection interface may include a resource function item to meet the video shooting requirement of a user, such as shooting props. By detecting a click operation of a user on a page containing the resource function item, a toolbar containing icons of various shooting props such as stickers, filters, and avatars is presented to the user. The user may select the required resource function by a click operation.

Figure 4:
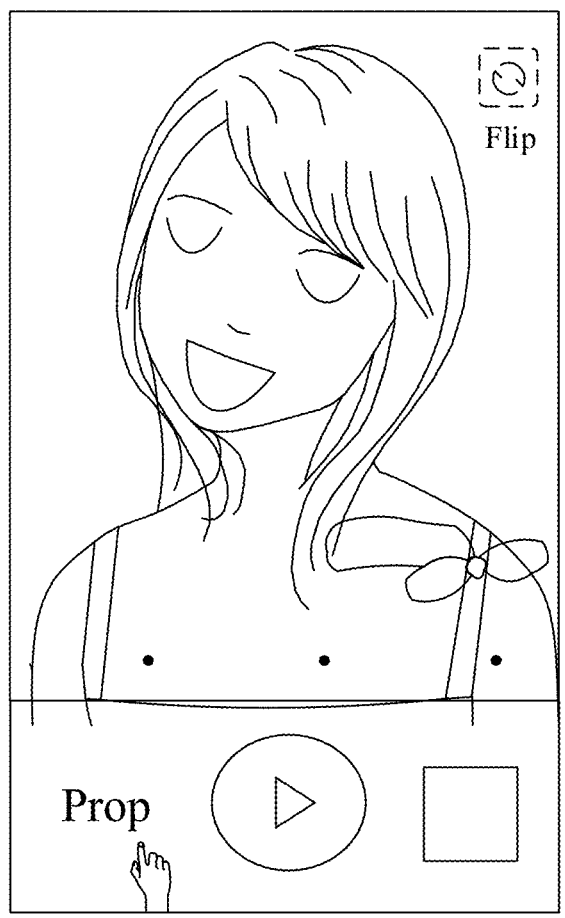
FIG. 4 is a schematic diagram of an image collection interface according to an embodiment of the present disclosure.
Figure 5:
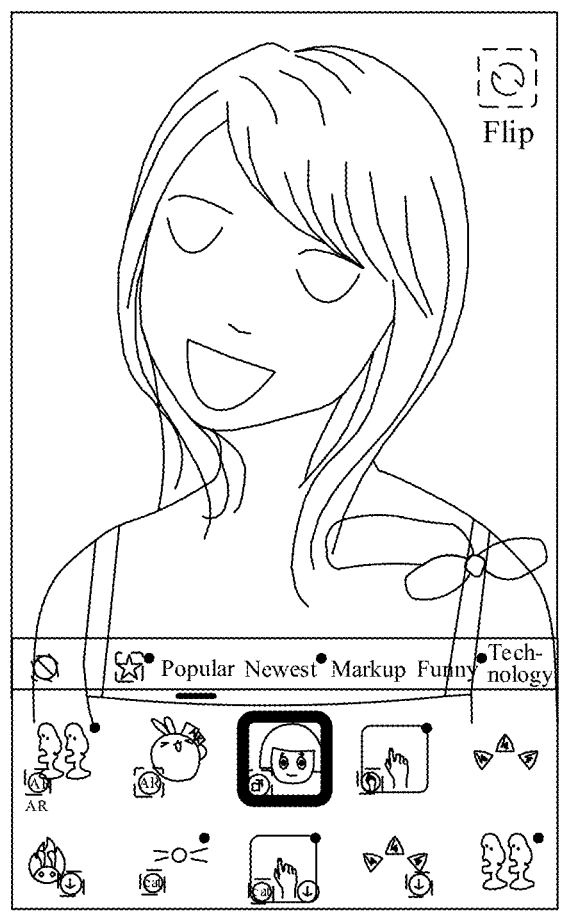
FIG. 5 is a schematic diagram of an image collection interface according to another embodiment of the present disclosure.

Exemplarily, referring to FIG. 4, FIG. 4 is a schematic diagram of an image collection interface according to an embodiment of the present disclosure. As can be seen from FIG. 4, the image collection interface includes buttons for props, video shooting, and the like. When the user clicks the button "Prop", that is, when the operation resource function item is clicked, the terminal may present a toolbar containing icons of various props. Referring to FIG. 5, FIG. 5 is a schematic diagram of an image collection interface according to another embodiment of the present disclosure. The image collection interface shown in FIG. 5 presents a toolbar including icons of various props such as stickers and avatars.

In this way, when the terminal detects that the shooting prop icon selected by the user is an avatar icon, based on the avatar icon, the terminal receives an avatar generation instruction triggered by the click operation of the user. Then, based on the avatar generation instruction, the terminal performs a corresponding response operation, and presents an image collection interface including the target object to the user.

Exemplarily, referring to FIG. 5, it can be seen that when the user clicks the avatar icon, the terminal presents the avatar icon as being selected, that is, the avatar icon may be surrounded by a box. In addition, the user clicks the avatar icon to trigger the avatar generation instruction, a preview frame image containing the target object may be presented on the image collection interface.

In some embodiments, the terminal may present the image collection interface in the following manner: loading an image scanning material including an image scanning frame; and presenting the image scanning frame in the image collection interface, where the image scanning frame matches a contour of the target object.

When the terminal presents the image collection interface, the terminal may load image scanning materials including special effects, background music, and the like to increase the experience of video shooting. In addition, the image collection interface may also present an image scanning frame, which is set based on the target object and matches the contour of the target object, to make the video taken by the user look sharp and comfortable overall.

In step 302, based on the image collection interface, a frame image of the target object is collected.

Based on the image collection interface presented above, a frame image of the target object is collected by an image collection device such as a camera.

In some embodiments, the frame image of the target object may be collected in the following manner: collecting the frame image of the target object based on the image scanning frame presented in the image collection interface; and presenting prompt information in a case that the contour of the target object in the collected frame image does not match the image scanning frame, where the prompt information is used to prompt adjustment of at least one of the following: a shooting posture, a shooting angle, and a shooting distance.

The frame image of the target object is collected through the image scanning frame presented on the above image collection interface. When the terminal detects that the contour of the target object in the collected frame image does not match the image scanning frame, that is, the contour of the target object does not completely fall within the image scanning frame, prompt information may be presented to the user to prompt the user to adjust their shooting posture, shooting angle, shooting distance, and the like, so that the contour of the target object matches the image scanning frame.

Figure 6:
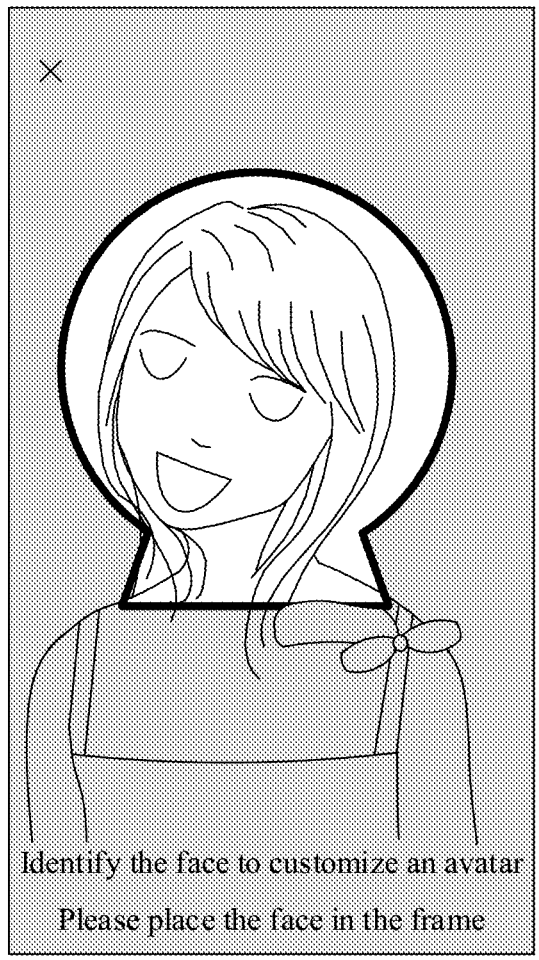
FIG. 6 is a schematic diagram of an image scanning frame according to an embodiment of the present disclosure.
Figure 7:
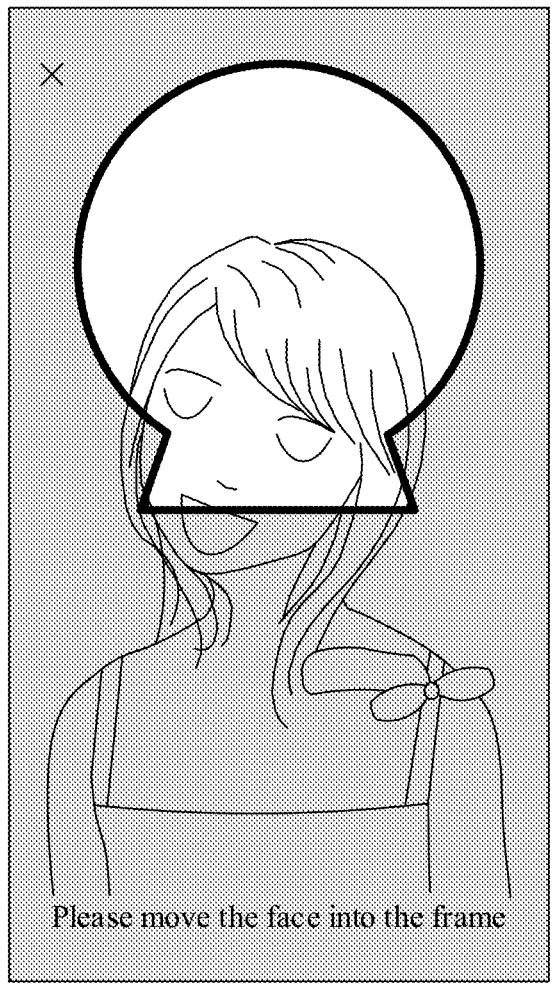
FIG. 7 is a schematic diagram of an image scanning frame according to another embodiment of the present disclosure.

Exemplarily, referring to FIG. 6, FIG. 6 is a schematic diagram of an image scanning frame according to an embodiment of the present disclosure. As can be seen from FIG. 6, when the terminal presents an image collection interface and detects a target object, the terminal presents the image scanning frame, and prompts, when generating an avatar, the user to place the face in the image scanning frame by displaying the text "Please put the face in the image scanning frame". If the terminal detects that the contour of the target object is not within the above image scanning frame, the terminal may prompt the user to adjust the shooting posture, shooting angle or shooting distance by displaying the text "Please take a frontal photo", "Please move the face to the frame", and the like. Referring to FIG. 7, FIG. 7 is a schematic diagram of an image scanning frame according to another embodiment of the present disclosure. In FIG. 7, the contour of the target object does not match the image scanning frame.

In addition, during an operation of collecting the frame image of the target object, if a back instruction for a current application process is received, a toolbar including an avatar icon is presented in response to the back instruction, and the avatar icon is focused in the toolbar.

In some embodiments, if a back instruction of a user for the current application process is received during the operation of collecting the frame image of the target object, a toolbar containing an avatar icon is presented on the view interface in response to the back instruction. The collection operation has not been completed, and the avatar for the target object has not been generated, and the avatar icon presented currently is a default avatar icon of the system, that is, an original avatar icon.

If it is detected that the user has generated an avatar and wants to generate an avatar again, a toolbar containing an avatar icon corresponding to the generated avatar is presented when a back instruction triggered by the user is received.

Specifically, when the toolbar is presented after receiving a back instruction, the avatar icon may be focused, that is, a selection box is controlled to be located on the avatar icon.

Figure 8:
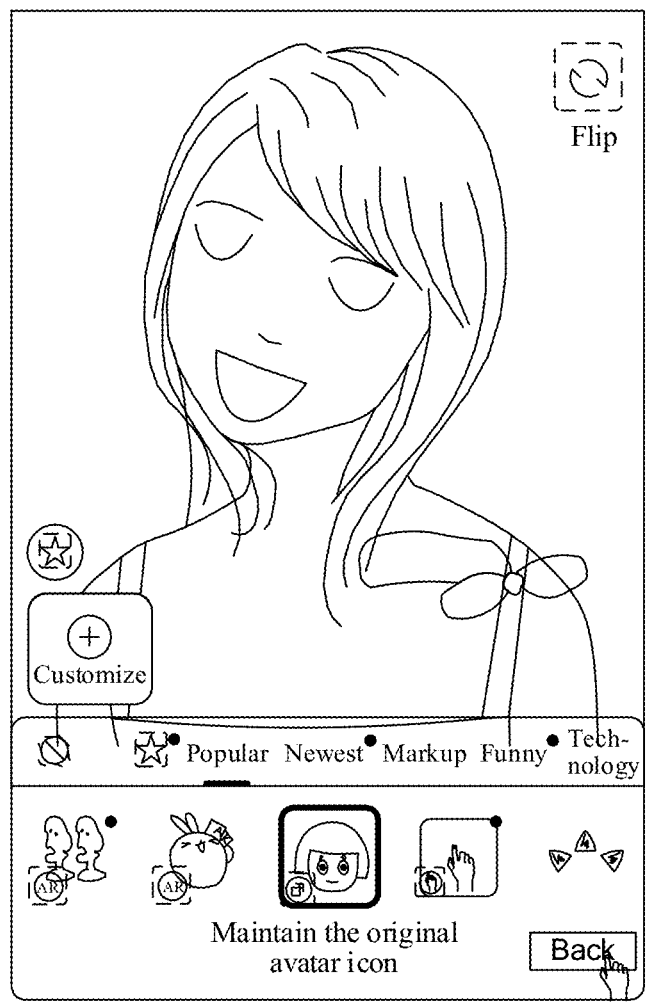
FIG. 8 is a schematic diagram of a toolbar presented in response to a back instruction according to an embodiment of the present disclosure.
Figure 9:
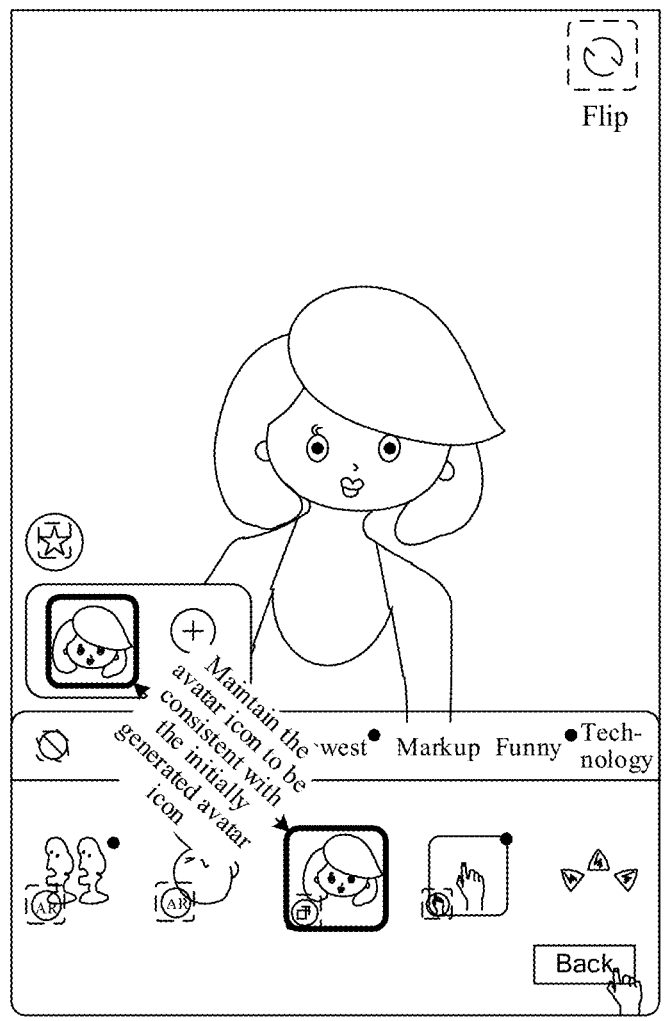
FIG. 9 is a schematic diagram of a toolbar presented in response to a back instruction according to another embodiment of the present disclosure.

Exemplarily, referring to FIG. 8, FIG. 8 is a schematic diagram of a toolbar presented in response to a back instruction according to an embodiment of the present disclosure. In FIG. 8, a user generates an avatar for the first time and a back instruction is triggered, when the terminal receives the back instruction triggered by the user, the terminal presents a toolbar containing an original avatar icon, and controls a selection box to be located on the original avatar icon. Referring to FIG. 9, FIG. 9 is a schematic diagram of a toolbar presented in response to a back instruction according to another embodiment of the present disclosure. In FIG. 9, the user has completed the generation of the avatar for the first time, and triggers the back instruction for generating the avatar again, when the terminal receives the back instruction triggered by the user, the terminal presents the toolbar containing the avatar icon of the avatar generated by the user for the first time. Similarly, the selection box is also controlled to be located on the avatar icon.

In step 303, based on the collected frame image of the target object, an avatar model corresponding to the target object is acquired, and a similarity between each part of a head of the avatar model and a corresponding part of a head of the target object meets a similarity condition.

After collecting the frame image of the target object, the terminal acquires an avatar model corresponding to the target object based on the frame image, so as to achieve the purpose of generating different avatars for different users.

In some embodiments, the avatar model corresponding to the target object may be acquired in the following manner: acquiring a feature of each part of a head of the target object based on the collected frame image of the target object; sending an acquisition request carrying the feature of each part of the head of the target object; and receiving the returned avatar model corresponding to the target object. The feature of each part of the head is used for predicting a category to which each part of the head belongs, so as to determine a material corresponding to each part of the head based on the predicted category. The material corresponding to each part of the head is used to generate the avatar model.

Here, each part of the head of the avatar model includes at least one of the following: eyes, hair, ears, mouth, nose, eyebrows, beard, and face shape.

After the frame image containing the target object is collected, each part of the head of the target object in the frame image is identified. Specifically, face key point detection may be performed on the frame image containing the target object to determine the face key points of the target object. Based on the determined face key points, face alignment algorithm is used for face alignment to identify each part of the head of the target object in the frame image, so as to determine the image area corresponding to each part of the head of the target object.

Based on the determined image area corresponding to each part of the head of the target object, the collected frame image is divided to obtain an image corresponding to each part of the head of the target object, feature extraction is performed on the image corresponding to each part of the head to obtain the feature of each part of the head of the target object, that is, the feature vector that characterizes the feature of each part of the head is obtained.

When the terminal may send the acquisition request for the avatar model to the server, the acquisition request may carry the above obtained feature of each part of the head of the target object.

After receiving the acquisition request carrying the feature of each part of the header of the target object, the server performs feature similarity matching on the obtained feature of each part to obtain the category to which each part of the head belongs. Alternatively, the feature vector characterizing the feature of each part is inputted to the neural network model to predict the category to which each part of the head belongs, so as to determine the category to which each part of the head belongs. Here, the category to which each part of the head belongs may be any combination of different categories with different attributes. Exemplarily, the attribute of the category to which the hair belongs may include length, curly degree, and hair color, and the corresponding categories may include bald, short hair, medium-length hair, long hair; curly hair, straight hair; black, brown, and yellow. By performing similarity matching between the feature of the hair in the frame image and the features of multiple preset categories of hair, the category to which the hair in the frame image belongs, for example, black medium-length straight hair is determined.

Continually, the material corresponding to each part of the head is determined based on the determined category of each part of the head, and an avatar model corresponding to the target object is generated based on the material corresponding to each part of the head.

Here, the extraction of the feature of each part of the head of the target object in the above steps is performed by the terminal, and in this embodiment of the present disclosure, the extraction of the feature may be performed by the server. Specifically, the server may perform the extraction by using a target neural network model obtained by pre-training. That is, firstly, through the feature extraction layer of the target neural network model, feature extraction is performed on the image corresponding to each target part of the head, and feature vectors corresponding to different attributes of the target part are obtained. Then, through the feature splicing layer of the target neural network model, vector splicing is performed on the obtained feature vectors corresponding to different attributes, and the feature vector corresponding to each target part is obtained. Finally, through the classification layer of the target neural network model, based on the feature vector corresponding to each target part, the category to which each target part belongs is predicted, so as to determine the category to which the target part belongs, to perform the subsequent steps of generating an avatar model.

Figure 10:
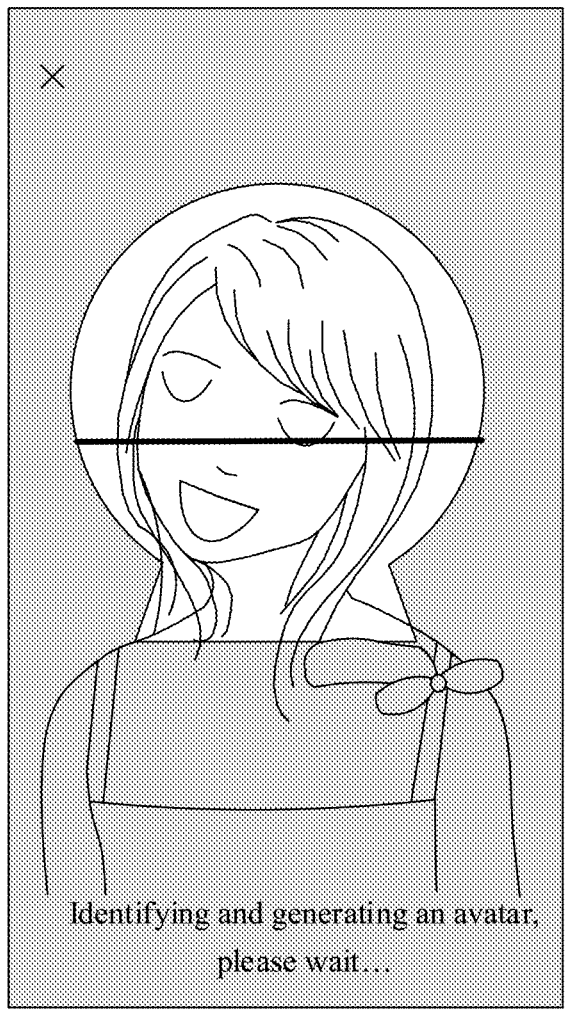
FIG. 10 is a schematic diagram of an operation of waiting for generating an avatar according to an embodiment of the present disclosure.

During the operation of avatar generation, analyzing frame image feature, downloading resources, and matching materials for various parts of the head all consume time. In some embodiments, text prompts may be used to reduce anxiety of a user in waiting. Referring to FIG. 10, FIG. 10 is a schematic diagram of an operation of waiting for generating an avatar according to an embodiment of the present disclosure. By presenting a text "Identifying and generating an avatar, please wait . . . ", the user is prompted that the avatar is being generated.

Based on the above steps, the server constructs an avatar model corresponding to the target object based on the feature of each part of the head of the target object, and the similarity between each part of the head of the avatar model and a corresponding part of the head of the target object meets the preset similarity condition, to generate different avatars for different target. In response to the received acquisition request for the avatar model of the terminal, the avatar model is sent to the terminal.

The terminal receives the avatar model corresponding to the target object that is returned by the server.

In some embodiments, the avatar model acquired by the terminal may also be stored locally. In this case, the terminal may directly call the avatar model from the storage location of the avatar model through the interface.

In step 304, the avatar of the target object is rendered and presented based on the avatar model.

According to the received avatar model, the avatar of the target object is obtained by a rendering processing of a graphics processor GPU and is presented.

In some embodiments, after the avatar of the target object is obtained by rendering, the avatar may also be dynamically presented in the following manner: collecting, based on the image collection interface, multiple continuative frame images of the target object; acquiring key point change information of the target object in the multiple continuative frame images; and dynamically presenting, based on the key point change information, the avatar of the target object.

After the avatar is generated for the target object, the avatar may also be dynamically presented to improve video shooting experience of the user, that is, the avatar can change according to the change of each part of the head of the target object.

Specifically, for the target object, the terminal collects multiple consecutive frame images through the image collection interface; identifies positions of key points of the target object in each frame image, such as head contour, eyes, eyebrows, and the like; determines changes of the positions of the key points between adjacent frame images, to obtain continuous change information of the position of each key point of the target object in the multiple frame images; and controls each part of the target object corresponding to each key point to change, to achieve the purpose of dynamically presenting the avatar of the target object.

In some embodiments, after the avatar of the target object is obtained by rendering, the avatar may be saved in the following manner: generating an avatar icon corresponding to the avatar of the target object, where the avatar icon is used to present the avatar of the target object when a click operation is received; and adding the avatar icon corresponding to the avatar of the target object to the toolbar in the image collection interface.

After the avatar for the target object is generated, the avatar generated by the user may be saved for subsequent use. Specifically, an avatar icon may be generated for the avatar of the target object, and the avatar icon be a thumbnail of the avatar, and the avatar icon is added to the toolbar of the image collection interface for subsequent use by the user.

It should be noted that the avatar icon added here and the avatar icon presented by default in the toolbar have different functions. When the avatar icon is selected, the terminal receives the click operation of the user, and directly presents the avatar corresponding to the target object, that is, the avatar corresponding to the avatar icon, without having to regenerate an avatar.

In some embodiments, the number of avatar icons may be controlled in the following manner: determining the number of generated avatar icons; closing, when the number of avatar icons reaches a number threshold, the function entry that triggers the avatar generation instruction.

Currently, the number of avatars that may be generated by the user is limited, so it is required to control the number of generated avatar icons. An upper limit threshold for the number of avatar icons may be preset, and when it is determined that the number of avatar icons reaches the number threshold, the function entry for triggering the avatar generation instruction may be closed.

Figure 11:
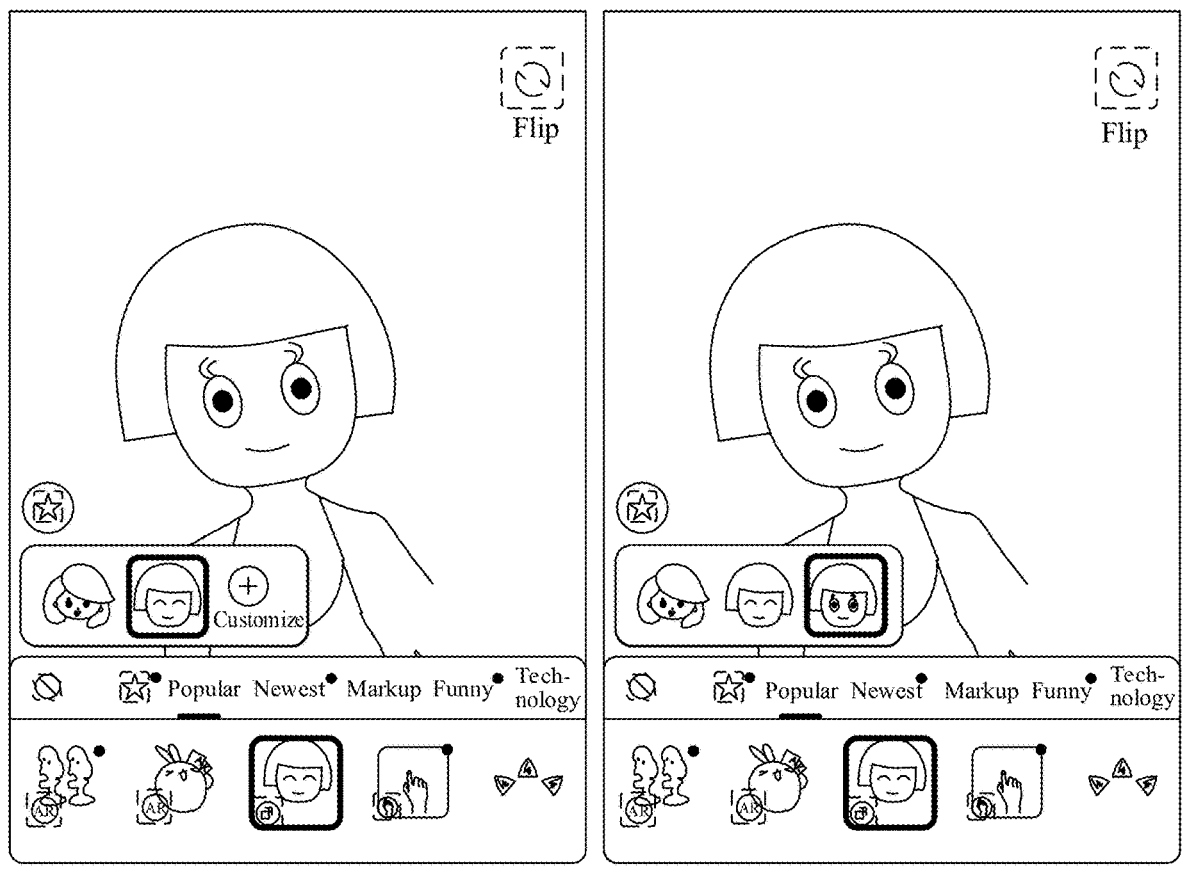
FIG. 11 is a schematic diagram of an operation of adding an avatar according to an embodiment of the present disclosure.

Exemplarily, referring to FIG. 11, FIG. 11 is a schematic diagram of an operation of adding an avatar according to an embodiment of the present disclosure. The user may click the button "+" in the left figure of FIG. 11 to generate an avatar corresponding to the user. The terminal adds the avatar icon corresponding to the avatar of the user to the toolbar. When it is determined that the number of avatar icons reaches the number threshold, for example, the preset number threshold is 3, and when the number of avatar icons reaches 3, the function entry that triggers the avatar generation instruction is closed, that is, the button "+" is no longer displayed, as shown in the right figure of FIG. 11.

In some embodiments, after the avatar of the target object is rendered and presented, the avatar may also be modified in the following manner: receiving a modification instruction for the avatar of the target object; acquiring an updated avatar model corresponding to the target object based on the modification instruction; and updating the presented avatar of the target object based on the updated avatar model.

Figure 12:
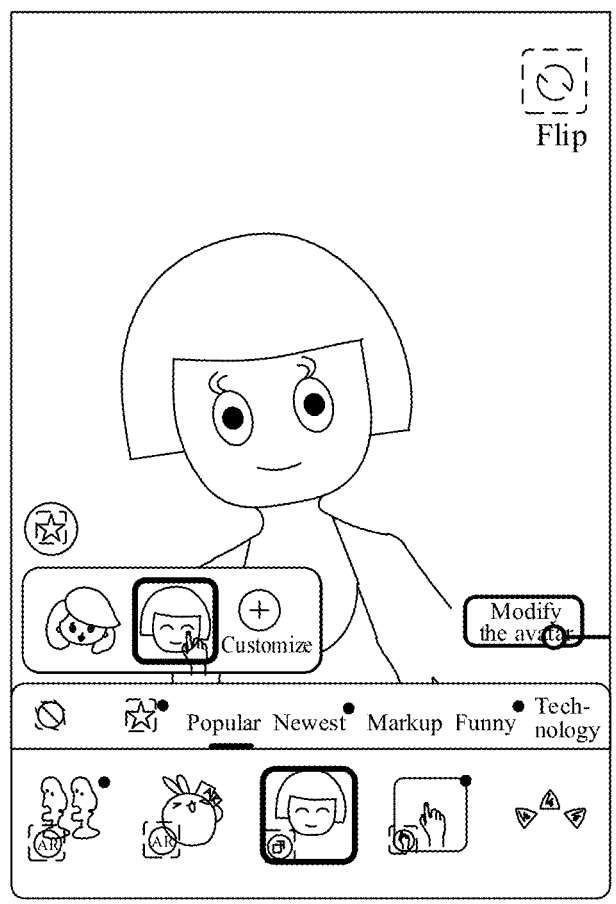
FIG. 12 is a schematic diagram of an avatar modification interface according to an embodiment of the present disclosure.

When the user does not satisfy the generated avatar, or wants to further improve the avatar, the user may select one of the avatar icons through a click operation to trigger a modification instruction of the avatar. Referring to FIG. 12, FIG. 12 is a schematic diagram of an avatar modification interface according to an embodiment of the present disclosure. In FIG. 12, the terminal displays that the user has generated two avatars. When a click operation of the user is received, the avatar icon corresponding to the avatar that the user wants to modify is surrounded by a selection box, and a button "modify the avatar" is displayed on the image collection interface for the user to perform a modification operation.

After receiving the modification instruction of the user for the avatar, the terminal re-presents the image collection interface. Specifically, the above steps 301 to 305 may be repeatedly performed, and the avatar model corresponding to the target object is generated again and is updated through the server, to obtain the updated avatar model. Then, based on the updated avatar model, the presented avatar of the target object is updated through rendering and other processing.

In addition, the terminal may also partially modify the avatar model for different parts of the head. For example, for the hair part, the terminal sends a request for modifying the hair part of the avatar model to the server, so that the server can identify the change of the hair part in the collected image frame, to make corresponding modifications to the hair part of the original avatar model, and return the updated avatar model to the terminal. Then, the terminal updates, based on the updated avatar model, the presented avatar of the target object through rendering and other processing.

In some embodiments, the association relationship between the user and the avatar model may be established in the following manner: obtaining user information of a current logged-in target user; establishing an association relationship between the user information and the avatar model. In this way, when the target user logs in again, the avatar model can be obtained based on the user information and the association relationship.

In practice, the client is usually provided with a user login function to save data information of a user. Therefore, in the embodiment of the present disclosure, the user may also be prompted to log in to the client through a pop-up login page, so as to save relevant user information of the user in real time.

After the avatar of the target object is generated with the above steps, the user information of the current logged-in target user may also be obtained, for example, an acquisition request for the user information may be sent to the server, to associate the acquired user information with the avatar model of the user, to establish the association relationship between user information and avatar model, so that when the target user logs in again, the corresponding avatar model can be directly obtained based on the user information of the target user and association relationship, to quickly generate an avatar.

In addition, the above association relationship may be stored in the server or in the terminal. Specifically, if the association relationship is stored in the server, the avatar can be quickly generated regardless of which terminal the user logs in. If the association relationship is stored in the terminal, the avatar model cannot be shared between terminals, thus it is required to regenerate the avatar model for a new terminal when the user log in the terminal. In this embodiment of the present disclosure, the storage location of the association relationship may be selected as required, which is not limited herein.

Figure 13:
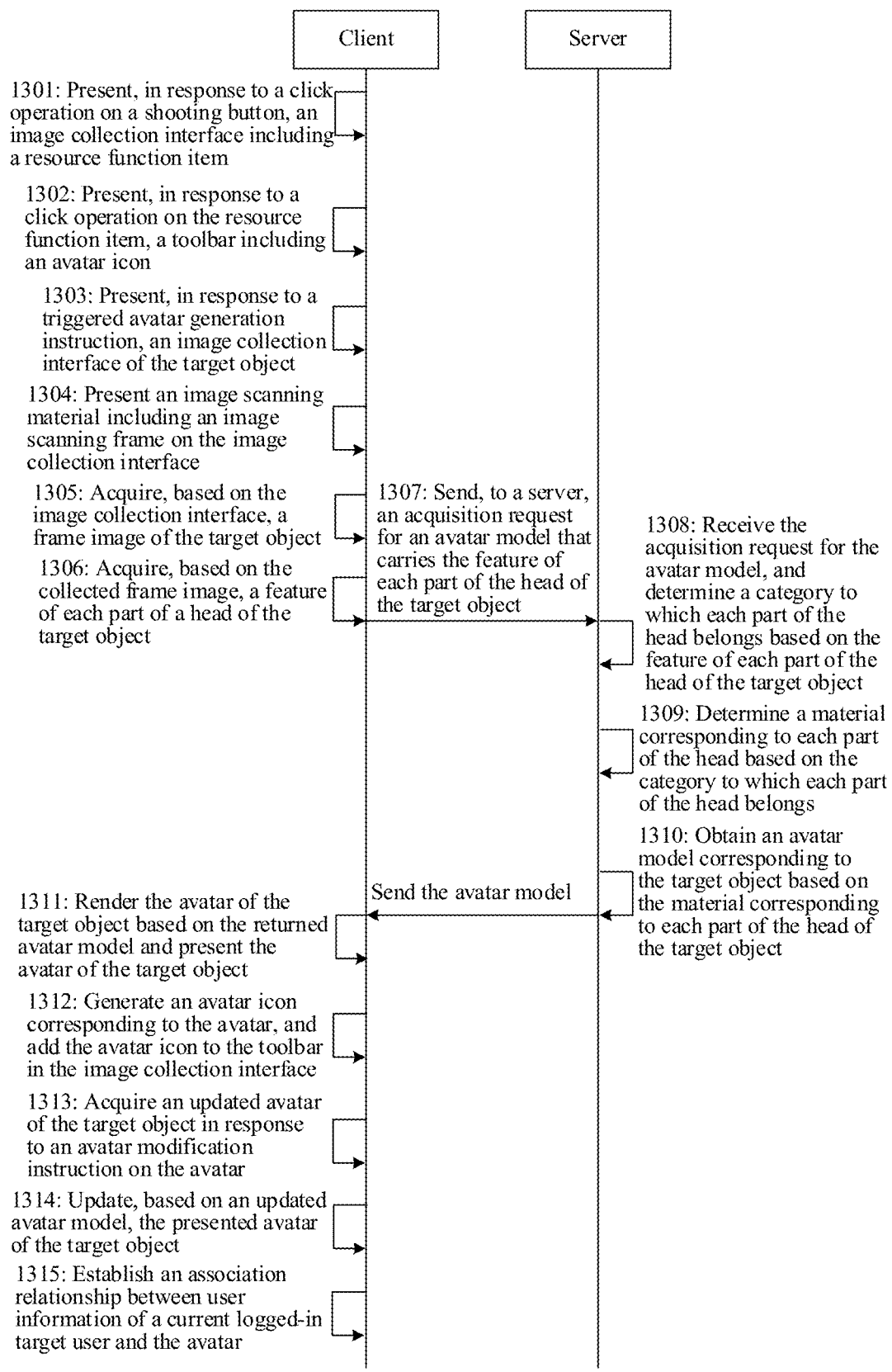
FIG. 13 is a schematic flowchart of an avatar generating method according to another embodiment of the present disclosure.

The avatar generating method according to an embodiment of the present disclosure is further described. Referring to FIG. 13, FIG. 13 is a schematic flowchart of an avatar generating method according to an embodiment of the present disclosure. The avatar generating method according to an embodiment of the present disclosure includes steps 1301 to 1315.

In step 1301, in response to a click operation on a shooting button, a terminal presents an image collection interface including a resource function item.

In step 1302, in response to a click operation on the resource function item, a toolbar including an avatar icon is presented.

Here, the avatar icon is used to trigger an avatar generation instruction when the click operation is received, and the user may trigger the avatar generation instruction by clicking the avatar icon in the toolbar.

In step 1303, in response to the triggered avatar generation instruction, an image collection interface of the target object is presented.

In step 1304, an image scanning material including an image scanning frame is presented on the image collection interface.

Here, the image scanning frame matches a contour of the target object, and may be used to prompt the user to adjust a shooting distance, a shooting posture, a shooting angle, and the like.

In step 1305, based on the image collection interface, a frame image of the target object is acquired.

Here, during the image collection operation, if a back instruction of a user for the current application process is received, a toolbar containing an avatar icon is presented, and a selection box is controlled to be located on the avatar icon.

In step 1306, based on the collected frame image, a feature of each part of a head of the target object is acquired.

In step 1307, an acquisition request for an avatar model that carries the feature of each part of the head of the target object is sent to the server.

In step 1308, the server receives the acquisition request for the avatar model, and determines a category to which each part of the head belongs based on the feature of each part of the head of the target object.

Here, the server may not only obtain the feature of each part of the head of the target object by parsing the acquisition request, but also realize the feature extraction of each part of the head through a neural network model.

In step 1309, the server determines a material corresponding to each part of the head based on the category to which each part of the head belongs.

In step 1310, an avatar model corresponding to the target object is obtained based on the material corresponding to each part of the head of the target object and is sent to the terminal.

In step 1311, the terminal renders and presents the avatar of the target object based on the returned avatar model.

Here, the terminal may dynamically present the avatar of the target object by collecting multiple continuative frame images of the target object and based on key point change information of the target object in the frame images.

In step 1312, an avatar icon corresponding to the avatar is generated, and is added to the toolbar in the image collection interface.

Here, the terminal may control the generation of the avatar by setting a number threshold for the number of avatar icons. Specifically, when the number of avatar icons reaches the number threshold, the function entry that triggers the avatar generation instruction is closed.

In step 1313, an updated avatar of the target object is acquired in response to an avatar modification instruction.

In step 1314, based on the updated avatar model, the presented avatar of the target object is updated.

In step 1315, an association relationship between user information of a current logged-in target user and the avatar is established.

The association relationship may be stored in the terminal or in the server, so that when the target user logs in again, the avatar model can be directly obtained based on the user information and the association relationship.

The above embodiments of the present disclosure have the following beneficial effects. According to the above embodiments of the present disclosure, the avatar model corresponding to the target object is acquired by collecting a frame image of the target object, and the avatar of the target object is rendered based on the avatar model. The similarity between each part of a head of the avatar model and a corresponding part of a head of the target object meets the similarity condition, so that the avatar is generated based on the feature of each part of the head of the target object, and different target objects correspond to different avatars, thereby generating a personalized avatar, thus improving the user experience.

Units and/or modules in the avatar generating device according to the embodiment of the present disclosure are described in the following. It should be understood that the units or modules in the avatar generating device may be implemented in the electronic device as shown in FIG. 2 by means of software (for example, the computer program stored in the above-mentioned computer software program), or implemented in electronic device as shown in FIG. 2 by means of the above-mentioned hardware logic components (such as FPGAs, ASICs, SOCs and CPLDs).

Figure 14:
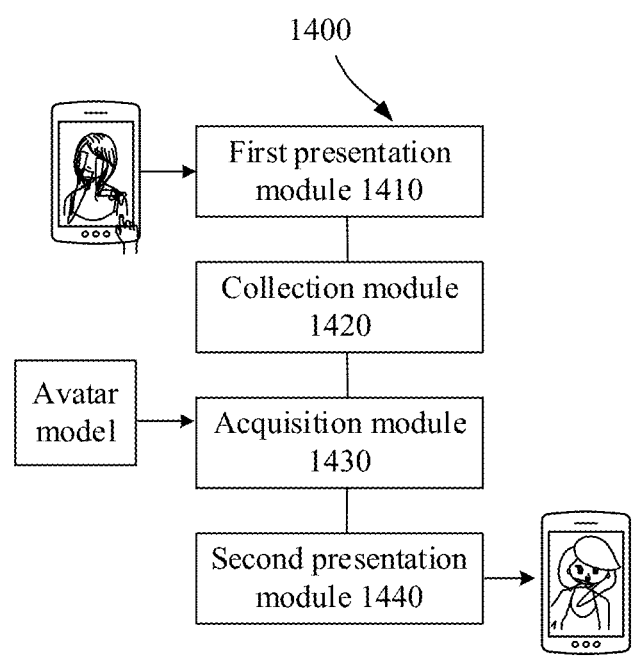
FIG. 14 is a schematic structural diagram of an avatar generating device according to an embodiment of the present disclosure.

Referring to FIG. 14, FIG. 14 is a schematic structural diagram of an avatar generating device 1400 according to an embodiment of the present disclosure, as shown in FIG. 14, the avatar generating device includes: a first presentation module 1410, a collection module 1420, an acquisition module 1430, and a second presentation Module 1440, the function of each module will be described below.

It should be noted that the classification of the above modules does not constitute a limitation on the electronic device itself. For example, some modules may be divided into two or more sub-modules, or some modules may be combined into a new module.

It should also be noted that the name of the above module does not constitute a limitation on the module itself under certain circumstances. For example, the "first presentation module 1410" may also be described as a module for "presenting the image collection interface of the target object in response to an avatar generation instruction triggered through a view interface".

For the same reason, the units and/or modules in the electronic device that are not described in detail do not represent the default of the corresponding units and/or modules, and all operations performed by the electronic device may be performed by the corresponding units and/or modules in the electronic device.

Continually, referring to FIG. 14, FIG. 14 is a schematic structural diagram of an avatar generating device 1400 according to an embodiment of the present disclosure, and the device includes: a first presentation module 1410, a collection module 1420, an acquisition module 1430, and second presentation module 1440. The first presentation module 1410 is configured to present an image collection interface of a target object in response to an avatar generation instruction triggered through the view interface. The collection module 1420 is configured to collect a frame image of the target object based on the image collection interface. The acquisition module 1430 is configured to acquire an avatar model corresponding to the target object based on the collected frame image of the target object, and a similarity between each part of a head of the avatar model and a corresponding part of a head of the target object meets a similarity condition. The second presentation module 1440 is configured to render and present the avatar of the target object based on the avatar model.

In some embodiments, the first presentation module 1410 is further configured to present an image collection interface including a resource function item in response to a click operation on the presented shooting button; and present, in response to a click operation on the resource function item, a toolbar including an avatar icon, where the avatar icon is configured to trigger an avatar generation instruction in a case that the click operation is received.

In some embodiments, the first presentation module 1410 is further configured to receive a back instruction for a current application process during an operation of collecting the frame image of the target object; and present, in response to the back instruction, the toolbar including the avatar icon, where the avatar icon is focused in the toolbar.

In some embodiments, the first presentation module 1410 is further configured to load an image scanning material including an image scanning frame; and present the image scanning frame in the image collection interface, where the image scanning frame matches a contour of the target object.

In some embodiments, the collection module 1420 is further configured to collect the frame image of the target object based on the image scanning frame presented in the image collection interface; and present prompt information in a case that the contour of the target object in the collected frame image does not match the image scanning frame, where the prompt information is configured to prompt adjustment of at least one of a shooting posture, a shooting angle, and a shooting distance.

In some embodiments, the acquisition module 1430 is further configured to acquire, based on the collected frame image of the target object, a feature of each part of the head of the target object; send an acquisition request carrying the feature of each part of the head of the target object; and receive the avatar model corresponding to the target object that is returned, where the feature of each part of the head is configured to predict a category to which each part of the head belongs, to determine a material corresponding to each part of the head based on the predicted category, where the material corresponding to each part of the head is configured to generate the avatar model.

In some embodiments, the device further includes an addition module 1450. The addition module 1450 is configured to generate an avatar icon corresponding to the avatar of the target object, where the avatar icon is used to present the avatar of the target object when a click operation is received; and add the avatar icon corresponding to the avatar of the target object to a toolbar in the image collection interface.

In some embodiments, the addition module 1450 is further configured to determine the number of the avatar icon that is generated; close a function entry that triggers the avatar generation instruction in a case that the number of the avatar icon reaches a number threshold.

In some embodiments, the second presentation module 1440 is further configured to collect, based on the image collection interface, multiple consecutive frame images of the target object; acquire key point change information of the target object in the multiple consecutive frame images; and dynamically present, based on the key point change information, the avatar of the target object.

In some embodiments, the device further includes a modification module 1460. The modification module 1460 is configured to receive a modification instruction for the avatar of the target object; acquire, based on the modification instruction, an updated avatar model corresponding to the target object; and update, based on the updated avatar model, the presented avatar of the target object.

In some embodiments, the device further includes an obtaining module 1470. The obtaining module 1470 is configured to obtain user information of a current logged-in target user; and establish an association relationship between the user information and the avatar model, to acquire the avatar model based on the user information and the association relationship when the target user logs-in again.

It should be noted that the above description of the avatar generating device is similar to the description of the above method, and has the same beneficial effects as the method, which is not repeated here. For technical details, please refer to the description of the method embodiment of the present disclosure.

A terminal is further provided according to an embodiment of the present disclosure, which includes a memory and a processor. The memory is configured to store executable instructions. The processor is configured to perform, when executing the executable instructions, the avatar generating method according to the embodiments of the present disclosure.

A storage medium is further provided according to an embodiment of the present disclosure, which stores executable instructions. The executable instructions, when executed, performs the avatar generating method according to any one of the above embodiments of the present disclosure.

According to one or more embodiments of the present disclosure, an avatar generating method is provided, which includes:
  presenting, in response to an avatar generation instruction triggered through a view interface, an image collection interface of a target object;
  collecting a frame image of the target object based on the image collection interface;
  acquiring, based on the collected frame image of the target object, an avatar model corresponding to the target object, where a similarity between each part of a head of the avatar model and a corresponding part of a head of the target object meets a similarity condition; and
  rendering and presenting an avatar of the target object based on the avatar model.

According to one or more embodiments of the present disclosure, the avatar generating method further includes:
  presenting, in response to a click operation on a presented shooting button, an image collection interface including a resource function item; and
  presenting, in response to a click operation on the resource function item, a toolbar including an avatar icon, where the avatar icon is used to trigger an avatar generation instruction in a case that the click operation is received.

According to one or more embodiments of the present disclosure, the avatar generating method further includes:
  receiving a back instruction for a current application process during an operation of collecting the frame image of the target object; and
  presenting, in response to the back instruction, the toolbar including the avatar icon, where the avatar icon is focused in the toolbar.

According to one or more embodiments of the present disclosure, in the avatar generating method, the presenting an image collection interface of a target object includes:
  loading an image scanning material including an image scanning frame; and
  presenting the image scanning frame in the image collection interface, where the image scanning frame matches a contour of the target object.

According to one or more embodiments of the present disclosure, in the avatar generating method, the collecting a frame image of the target object based on the image collection interface includes:
  collecting the frame image of the target object based on the image scanning frame presented in the image collection interface; and
  presenting prompt information in a case that the contour of the target object in the collected frame image does not match the image scanning frame, where the prompt information is used to prompt adjustment of at least one of a shooting posture, a shooting angle, and a shooting distance.

According to one or more embodiments of the present disclosure, in the avatar generating method, the sending an acquisition request for an avatar of the target object based on the collected frame image of the target object includes:
  acquiring, based on the collected frame image of the target object, a feature of each part of the head of the target object;
  sending an acquisition request carrying the feature of each part of the head of the target object; and
  receiving the avatar model corresponding to the target object that is returned,
  where the feature of each part of the head is used to predict a category to which each part of the head belongs, to determine a material corresponding to each part of the head based on the predicted category, where the material corresponding to each part of the head is used to generate the avatar model.

According to one or more embodiments of the present disclosure, the avatar generating method further includes:
  generating an avatar icon corresponding to the avatar of the target object, where the avatar icon is used to present the avatar of the target object when a click operation is received; and
  adding the avatar icon corresponding to the avatar of the target object to a toolbar in the image collection interface.

According to one or more embodiments of the present disclosure, the avatar generating method further includes:
  determining the number of the avatar icon that is generated;
  closing a function entry that triggers the avatar generation instruction in a case that the number of the avatar icon reaches a number threshold.

According to one or more embodiments of the present disclosure, the avatar generating method further includes:

collecting, based on the image collection interface, multiple consecutive frame images of the target object;
acquiring key point change information of the target object in the multiple consecutive frame images; and
dynamically presenting, based on the key point change information, the avatar of the target object.

According to one or more embodiments of the present disclosure, the avatar generating method further includes:
receiving a modification instruction for the avatar of the target object;
acquiring, based on the modification instruction, an updated avatar model corresponding to the target object; and
updating, based on the updated avatar model, the presented avatar of the target object.

According to one or more embodiments of the present disclosure, the avatar generating method further includes:
obtaining user information of a current logged-in target user; and
establishing an association relationship between the user information and the avatar model, to acquire the avatar model based on the user information and the association relationship when the target user logs-in again.

According to one or more embodiments of the present disclosure, an avatar generating device is provided, which includes: a first presentation module, a collection module, an acquisition module, and a second presentation module. The first presentation module is configured to present, in response to an avatar generation instruction triggered through a view interface, an image collection interface of a target object. The collection module is configured to collect a frame image of the target object based on the image collection interface. The acquisition module is configured to acquire, based on the collected frame image of the target object, an avatar model corresponding to the target object, where a similarity between each part of a head of the avatar model and a corresponding part of a head of the target object meets a similarity condition. The second presentation module is configured to render and present the avatar of the target object based on the avatar model.

The above description merely illustrates the embodiments of the present disclosure and the technical principles employed. Those skilled in the art should understand that the scope of present disclosure is not limited to the technical solutions formed by any combination of the above-mentioned technical features, and should also cover other technical solutions formed by any combination of the above-mentioned technical features and any equivalent features without departing from the above disclosed concept, for example, a technical solution formed by replacing the above features with the technical features disclosed in the present disclosure (but not limited to) with similar functions.

Additionally, although operations are described in a particular order, this should not be construed that the operations are performed in the particular order shown or in a sequential order. Under certain circumstances, multitasking and parallel processing may be advantageous. Although several implementation-specific details are described above, these should not be construed as limitations on the scope of the present disclosure. Certain features that are described in the context of a single embodiment may also be applied in a single embodiment. Conversely, features that are described in the context of a single embodiment may also be applied in multiple embodiments separately or in any suitable sub combination.

Although the subject matter has been described in language specific to structural features and/or method logical acts, it is to be understood that the subject matter defined in the claims is not necessarily limited to the specific features or acts described above. Rather, the specific features and acts described above are merely example forms of implementing the claims.

The invention claimed is:

1. An avatar generating method, comprising:
presenting an image collection interface comprising a resource function item;
displaying a toolbar in response to detecting a selection of the resource function item, wherein the toolbar comprises a plurality of icons corresponding to a plurality of resource functions, the plurality of icons comprise an avatar icon configured to trigger an avatar generation instruction, and the avatar icon currently displayed in the toolbar is a default avatar icon;
generating the avatar generation instruction in response to detecting a selection of the default avatar icon;
presenting the image collection interface including a target object based on the avatar generation instruction;
collecting a frame image of the target object based on the image collection interface;
displaying the toolbar comprising the default avatar icon in response to receiving a back instruction for a current application process during a process of collecting the frame image of the target object;
acquiring, based on the collected frame image of the target object, an avatar model corresponding to the target object, wherein the avatar model corresponding to the target object is generated by identifying parts of a head of the target object based on the frame image, dividing the frame image to images corresponding to the parts of the head, extracting features from the images corresponding to the parts of the head, predicting a category to which each part of the head belongs based on the features by a neural network model, determining a material corresponding to each part of the head based on the predicted category, and generating the avatar model based on the material corresponding to each part of the head, and wherein a similarity between each part of a head of the generated avatar model and a corresponding part of the head of the target object meets a similarity condition;
generating an avatar of the target object based on the avatar model; and
displaying the toolbar comprising the avatar icon that is an avatar icon corresponding to the generated avatar of the target object in response to detecting that a generation of the avatar of the target object has been completed when receiving another back instruction.

2. The method according to claim 1, further comprising:
presenting, in response to the back instruction, the toolbar comprising the default avatar icon, wherein the default avatar icon is focused in the toolbar; and
presenting, in response to the another back instruction, the toolbar comprising the avatar icon corresponding to the generated avatar of the target object, wherein the avatar icon is focused in the toolbar.

3. The method according to claim 1, wherein the presenting an image collection interface of a target object comprises:
loading an image scanning material comprising an image scanning frame; and
presenting the image scanning frame in the image collection interface, wherein the image scanning frame matches a contour of the target object.

4. The method according to claim 3, wherein the collecting a frame image of the target object based on the image collection interface comprises:
collecting the frame image of the target object based on the image scanning frame presented in the image collection interface; and
presenting prompt information in a case that the contour of the target object in the collected frame image does not match the image scanning frame, wherein the prompt information is used to prompt adjustment of at least one of a shooting posture, a shooting angle, and a shooting distance.

5. The method according to claim 1, wherein the acquiring, based on the collected frame image of the target object, an avatar model corresponding to the target object comprises:
acquiring, based on the collected frame image of the target object, a feature of each part of the head of the target object;
sending an acquisition request carrying the feature of each part of the head of the target object; and
receiving the avatar model corresponding to the target object that is returned.

6. The method according to claim 1, further comprising:
generating an avatar icon corresponding to the avatar of the target object, wherein the avatar icon is used to present the avatar of the target object when a click operation is received; and
adding the avatar icon corresponding to the avatar of the target object to a tool bar in the image collection interface.

7. The method according to claim 6, further comprising:
determining the number of the avatar icon that is generated;
closing a function entry that triggers the avatar generation instruction in a case that the number of the avatar icon reaches a number threshold.

8. The method according to claim 1, further comprising:
collecting, based on the image collection interface, a plurality of consecutive frame images of the target object;
acquiring key point change information of the target object in the plurality of consecutive frame images; and
dynamically presenting, based on the key point change information, the avatar of the target object.

9. The method according to claim 1, wherein after the rendering and presenting the avatar of the target object, the method further comprises:
receiving a modification instruction for the avatar of the target object;
acquiring, based on the modification instruction, an updated avatar model corresponding to the target object; and
updating, based on the updated avatar model, the presented avatar of the target object.

10. The method according to claim 1, wherein after the rendering and presenting the avatar of the target object, the method further comprises:
obtaining user information of a current logged-in target user; and
establishing an association relationship between the user information and the avatar model, to acquire the avatar model based on the user information and the association relationship when the target user logs-in again.

11. An avatar generating device, comprising:
a memory, configured to store executable instructions; and
a processor, when executing the executable instructions, configured to perform operations comprising:
presenting an image collection interface comprising a resource function item;
displaying a toolbar in response to detecting a selection of the resource function item, wherein the toolbar comprises a plurality of icons corresponding to a plurality of resource functions, the plurality of icons comprise an avatar icon configured to trigger an avatar generation instruction, and the avatar icon currently displayed in the toolbar is a default avatar icon;
generating the avatar generation instruction in response to detecting a selection of the default avatar icon;
presenting the image collection interface including a target object based on the avatar generation instruction;
collecting a frame image of the target object based on the image collection interface;
displaying the toolbar comprising the default avatar icon in response to receiving a back instruction for a current application process during a process of collecting the frame image of the target object;
acquiring, based on the collected frame image of the target object, an avatar model corresponding to the target object, wherein the avatar model corresponding to the target object is generated by identifying parts of a head of the target object based on the frame image, dividing the frame image to images corresponding to the parts of the head, extracting features from the images corresponding to the parts of the head, predicting a category to which each part of the head belongs based on the features by a neural network model, determining a material corresponding to each part of the head based on the predicted category, and generating the avatar model based on the material corresponding to each part of the head, and wherein a similarity between each part of a head of the generated avatar model and a corresponding part of the head of the target object meets a similarity condition;
generating an avatar of the target object based on the avatar model; and
displaying the toolbar comprising the avatar icon that is an avatar icon corresponding to the generated avatar of the target object in response to detecting that a generation of the avatar of the target object has been completed when receiving another back instruction.

12. The device according to claim 11, wherein the processor, when executing the executable instructions, configured to perform operations comprising:
loading an image scanning material comprising an image scanning frame; and
presenting the image scanning frame in the image collection interface, wherein the image scanning frame matches a contour of the target object.

13. The device according to claim 12, wherein the processor, when executing the executable instructions, configured to perform operations comprising:
collecting the frame image of the target object based on the image scanning frame presented in the image collection interface; and
presenting prompt information in a case that the contour of the target object in the collected frame image does not match the image scanning frame, wherein the prompt information is configured to prompt adjustment of at least one of a shooting posture, a shooting angle, and a shooting distance.

14. The device according to claim 11, wherein the processor, when executing the executable instructions, configured to perform operations comprising:
    acquiring, based on the collected frame image of the target object, a feature of each part of the head of the target object;
    sending an acquisition request carrying the feature of each part of the head of the target object; and
    receiving the avatar model corresponding to the target object that is returned,
    wherein the feature of each part of the head is configured to predict a category to which each part of the head belongs, to determine a material corresponding to each part of the head based on the predicted category, wherein the material corresponding to each part of the head is configured to generate the avatar model.

15. The device according to claim 11, wherein the processor, when executing the executable instructions, configured to perform operations comprising:
    collecting, based on the image collection interface, a plurality of consecutive frame images of the target object;
    acquiring key point change information of the target object in the plurality of consecutive frame images; and
    dynamically presenting, based on the key point change information, the avatar of the target object.

16. The device according to claim 11, wherein the processor, when executing the executable instructions, configured to perform operations comprising:
    receiving a modification instruction for the avatar of the target object;
    acquiring, based on the modification instruction, an updated avatar model corresponding to the target object; and
    updating, based on the updated avatar model, the presented avatar of the target object.

17. A non-transitory storage medium, comprising executable instructions stored thereon, wherein the executable instructions, when executed, performs operations comprising:
    presenting an image collection interface comprising a resource function item;
    displaying a toolbar in response to detecting a selection of the resource function item, wherein the toolbar comprises a plurality of icons corresponding to a plurality of resource functions, the plurality of icons comprise an avatar icon configured to trigger an avatar generation instruction, and the avatar icon currently displayed in the toolbar is a default avatar icon;
    generating the avatar generation instruction in response to detecting a selection of the default avatar icon;
    presenting the image collection interface including a target object based on the avatar generation instruction;
    collecting a frame image of the target object based on the image collection interface;
    displaying the toolbar comprising the default avatar icon in response to receiving a back instruction for a current application process during a process of collecting the frame image of the target object;
    acquiring, based on the collected frame image of the target object, an avatar model corresponding to the target object, wherein the avatar model corresponding to the target object is generated by identifying parts of a head of the target object based on the frame image, dividing the frame image to images corresponding to the parts of the head, extracting features from the images corresponding to the parts of the head, predicting a category to which each part of the head belongs based on the features by a neural network model, determining a material corresponding to each part of the head based on the predicted category, and generating the avatar model based on the material corresponding to each part of the head, and wherein a similarity between each part of a head of the generated avatar model and a corresponding part of the head of the target object meets a similarity condition;
    generating an avatar of the target object based on the avatar model; and
    displaying the toolbar comprising the avatar icon that is an avatar icon corresponding to the generated avatar of the target object in response to detecting that a generation of the avatar of the target object has been completed when receiving another back instruction.

* * * * *